United States Patent
Teraura

(10) Patent No.: US 6,827,279 B2
(45) Date of Patent: Dec. 7, 2004

(54) SHEET OF PRINTING PAPER, A PRINTER, A COPY MACHINE, A FACSIMILE, A DOCUMENT SCANNER, A METHOD OF CONTROLLING A PRINTER, A METHOD OF CONTROLLING A DOCUMENT SCANNER, A METHOD OF CONTROLLING A SCANNER, A PRINTER AND A COMMUNICATION UNIT

(75) Inventor: Nobuyuki Teraura, Tokai (JP)

(73) Assignee: Denso Wave Incorporated, Tokyo (JP)

( * ) Notice: Subject to any disclaimer, the term of this patent is extended or adjusted under 35 U.S.C. 154(b) by 101 days.

(21) Appl. No.: 10/126,627

(22) Filed: Apr. 22, 2002

(65) Prior Publication Data

US 2002/0170973 A1 Nov. 21, 2002

(30) Foreign Application Priority Data

May 15, 2001 (JP) .................................. 2001-144698

(51) Int. Cl.[7] .............................................. G06K 19/06
(52) U.S. Cl. ........................................ 235/492; 235/382
(58) Field of Search ................................. 235/492, 375, 235/380, 494, 382; 340/10.1–10.6, 572.1–572.9; 358/443, 468

(56) References Cited

U.S. PATENT DOCUMENTS

| | | | | |
|---|---|---|---|---|
| 5,644,408 A | * | 7/1997 | Li et al. | 358/468 |
| 6,109,526 A | * | 8/2000 | Ohanian et al. | 235/462.45 |
| 6,249,226 B1 | * | 6/2001 | Harrison et al. | 340/572.1 |
| 6,409,401 B1 | * | 6/2002 | Petteruti et al. | 400/88 |
| 6,585,154 B1 | * | 7/2003 | Ostrover et al. | 235/375 |

* cited by examiner

Primary Examiner—Michael G. Lee
Assistant Examiner—Jamara A. Franklin
(74) Attorney, Agent, or Firm—Posz & Bethards, PLC

(57) ABSTRACT

A sheet of printing paper has an RFID tag for receiving, storing, and transmitting data through radio wave signals. A printer detects the RFID data to be written in the RFID tag in the received data and records the RFID data in the RFID tag on a sheet of printing paper in addition to the general printing operation. A copy machine can copy the RFID data from the RFID tag on the sheet of document paper to the RFID tag on the sheet of printing paper in addition to the image copying. ID data or inhibit/permission data from the RFID tag is used to control the copy operation and transmission in a facsimile. ID data is recorded on the RFID tag on the sheet of the document paper or the printing paper on copying or transmission. The RFID data is transmitted by the facsimile in addition to image data transmission.

20 Claims, 11 Drawing Sheets

SHEET OF PRINTING PAPER, A PRINTER, A COPY MACHINE, A FACSIMILE, A DOCUMENT SCANNER, A METHOD OF CONTROLLING A PRINTER, A METHOD OF CONTROLLING A DOCUMENT SCANNER, A METHOD OF CONTROLLING A SCANNER, A PRINTER AND A COMMUNICATION UNIT

BACKGROUND OF THE INVENTION

1. Field of the Invention

This invention relates to a sheet of printing paper, a printer, a copy machine, a facsimile, a document scanner, a method of controlling a printer, a method of controlling a document scanner, a method of controlling a scanner, a printer, and a communication unit.

2. Description of the Prior Art

For example, it is convenient that a software is delivered with its manual in one body. Thus, it is required to store digital data readable by a computer together with visual data, i.e., characters, figures, and photo image in the same medium or a combined medium. Such a prior art medium has not been found.

SUMMARY OF THE INVENTION

The aim of the present invention is to provide a superior sheet of printing paper, a superior printer, a superior copy machine, a superior facsimile, a superior document scanner, a superior method of controlling a printer, a superior method of controlling a scanner, a superior method of controlling a scanner, a printer, and a communication unit.

According to the present invention, a first aspect of the present invention provides a sheet of printing paper comprising: a sheet of paper which is printable; and an RFID (Radio Frequency Identification) tag supported by said sheet of paper for receiving, storing, and transmitting data through radio wave signals and storing said data.

The RFID tag may be arranged at a corner of said sheet of paper and may be embedded in said paper.

According to the present invention, a second aspect of the present invention provides a printer for printing an image on a sheet of printing paper with an RFID tag on the basis of data for vision included in received data which further includes RFID data to be recorded in said RFID tag comprising:

printing means for printing said image on said sheet on the basis of said data for vision; and recording means for recording said RFID data in said RFID tag.

In the second aspect, the received data may selectively include said RFID data, and said printer may further comprise: detecting means for detecting whether said received data includes said RFID data; and paper feeding means having first paper tray for containing at least a sheet of first printing paper with said RFID tag and second paper tray for containing at least a sheet of second printing paper without said RFID tag, wherein said paper feeding means feeds said sheet of first printing paper with said RFID tag from said first paper tray to print said image with said printing means on said sheet of first printing paper and to record said RFID data in said RFID tag of said sheet of first printing paper when said detection means detects that said received data includes said RFID data.

According to the present invention, a third aspect of the present invention provides a copying machine comprising:

image reading means for reading an image on a sheet of document paper with a first RFID tag for receiving, storing, and transmitting first data;

printing means for printing said image on a sheet of printing paper which includes a second RFID tag for receiving, storing, and transmitting second data;

data reading means for reading said first data from said first RFID tag; and data recording means for recording said first data from said data reading means as said second data in said second RFID tag.

In the third aspect, the sheet of document paper may selectively include said first RFID tag, and said copying machine may further comprise: detecting means for detecting whether said sheet of document paper includes said first RFID tag; and paper feeding means having first paper tray for containing at least a sheet of first printing paper with said RFID tag and second paper tray for containing at least a sheet of second printing paper without said RFID tag, wherein said paper feeding means feeds a sheet of said first printing paper with said RFID tag from said first paper tray to print said image from said image reading means with said printing means on a sheet of first printing paper and to record said RFID data in said RFID tag of said sheet of first printing paper when said detection means detects that said sheet of document paper has said first RFID tag.

According to the present invention, a fourth aspect of the present invention provides a facsimile comprising:

image reading means for reading an image on a sheet of document paper including a first RFID tag to generate first image data, said first RFID tag receiving, transmitting, and storing first RFID data;

transmitting means for transmitting first data including said image data;

RFID data reading means for reading first RFID data from said first RFID tag, said transmitting means transmitting said first RFID data together with said first data;

receiving means for receiving second data including second image data and second RFID data;

printing means for printing said second image on a sheet of printing paper with a second RFID tag, said second RFID tag receiving, transmitting, and storing second RFID data; and RFID data recording means for recording said second RFID data in second RFID tag of said sheet of printing paper.

According to the present invention, a fifth aspect of the present invention provides a document scanner comprising:

image reading means for reading an image on a sheet of document paper with an RFID tag for receiving, storing, and transmitting RFID data;

RFID data reading means for reading said RFID data from said RFID tag; and outputting means for outputting first data indicative of said image and said RFID data.

According to the present invention, a sixth aspect of the present invention provides a method of controlling a printer for printing an image on a sheet of printing paper with an RFID tag on the basis of data for vision included in received data which selectively includes RFID data to be written in said RFID tag comprising the steps of:

detecting whether said received data including RFID data; and recording said RFID data in said RFID tag when said received data includes said RFID data in addition to printing said image on said printing paper.

According to the present invention, a seventh aspect of the present invention provides a method of controlling a scanner comprising:

reading an image on a sheet of document paper with an RFID tag for receiving, storing, and transmitting RFID data;

reading said RFID data from said RFID tag; and outputting means for outputting first data indicative of said image and said read RFID data.

According to the present invention, an eighth aspect of the present invention provides a method of controlling a scanner, a printer, and a communication unit coupled to a network comprising the step of:

reading an image on a sheet of document paper including a first RFID tag to generate first image data with said scanner, said first RFID tag receiving, transmitting, and storing first RFID data;

transmitting first data including said image data with the use of said communication unit;

reading first RFID data from said first RFID tag;

transmitting said first RFID data together with said first data;

receiving second data including second image data and second RFID data with the use of said communication unit;

printing said second image on a sheet of printing paper with a second RFID tag with the use of said printer, said second RFID tag receiving, transmitting, and storing second RFID data; and recording said second RFID data in second RFID tag of said sheet of printing paper.

In the fourth, fifth, seventh, and eighth aspects, the inputted ID number may be recorded in the RFID tag of the sheet of document paper or in the RFID tag of the sheet of printing paper. Moreover, if RFID data includes permission data including identification data in said first data from said RFID tag of the sheet of document paper, said control means may effect copying or facsimile-transmitting said image on said printing paper when said identification data from identification data reading means agrees with said identification data from said inputting means when said permission data reading means can read said permission data. Moreover, if the RFID data from the RFID tag of the sheet of document paper includes inhibition data, the control means may inhibit copying or facsimile-transmitting said image.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Figure 1:
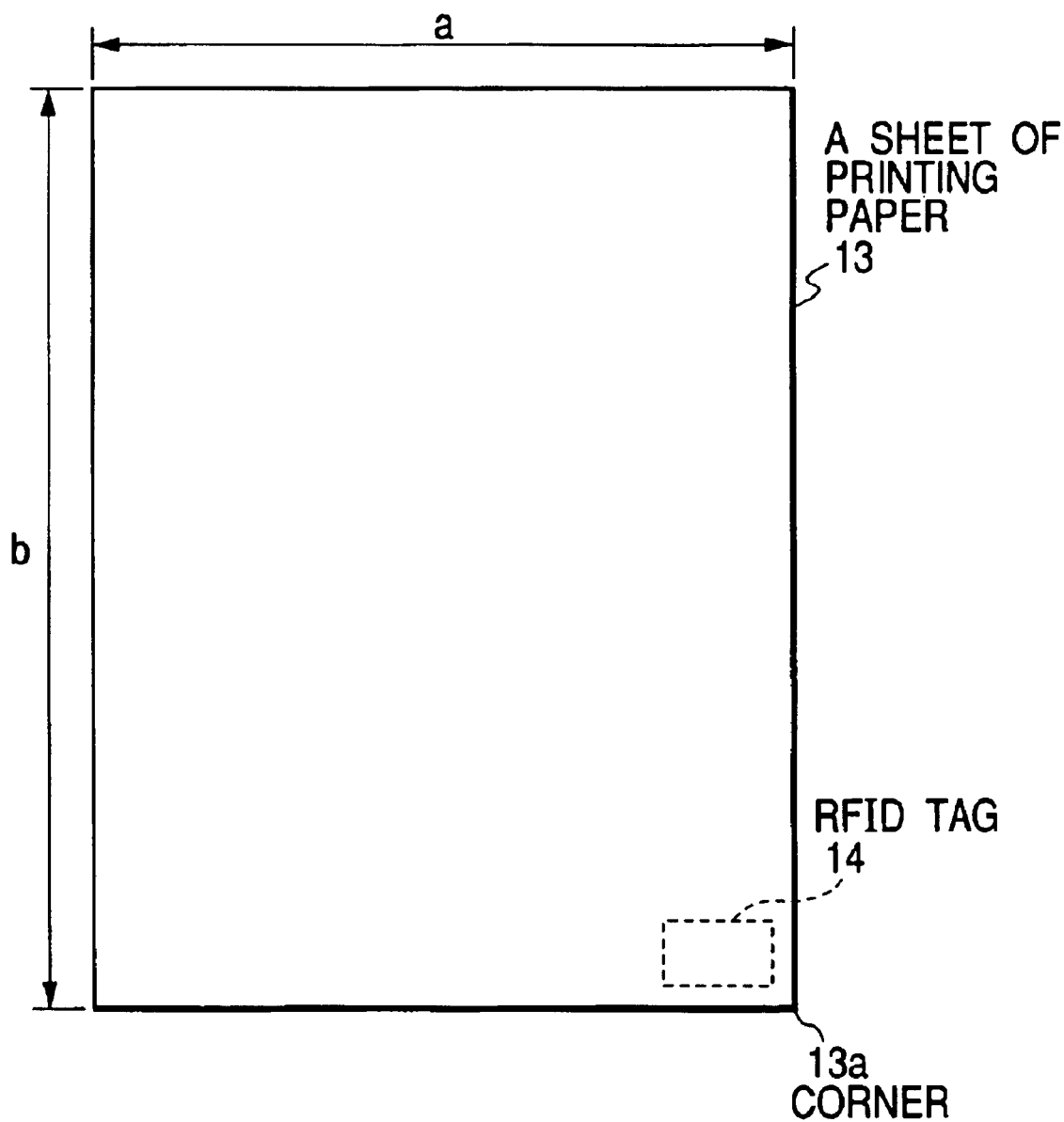
FIG. 1 is a plan view of a sheet of printing paper according to this invention.

FIG. 1 shows a sheet of printing paper 13 according to this invention. The sheet of printing paper 13 has an RFID (Radio Frequency Identification) tag 14 for transmitting and receiving data through radio wave signals. The printing paper 13 has one of predetermined sizes. For example, the printing paper 13 has DIN A4 size. In this case, the length a is 210 mm and the length b is 297 mm. The printing paper 13 may have one of DIN B sizes and other regular sizes. The RFID tag 14 is supported by the sheet of printing paper 13. Moreover, the RFID tag 14 is arranged at a corner 13a of the sheet of printing paper 13 for example. Thus, the presence of the RFID tag 14 does not disturb printing operation and provides no unnatural feeling to the user. However, the RFID tag 14 can be arranged at the middle of the sheet of the printing paper 13.

Moreover, the RFID tag 14 may have a predetermined flexibility to be bent together with the printing paper such that the RFID tag 14 can be fed through a printing paper feed path 9 (FIG. 2) of a printing portion and through a document paper feeding path 4 (FIG. 2) because the size of the chip 51 is extremely small, for example, 1×2 mm, and the antenna coil 18 is printed on a flexible thin plastic film 52 (FIG. 3B) with a flexible electrically conductive pattern. Further, the RFID tag 14 may have a heat resistance to bear the fixing process with a heat roller 50 of the copy machine. Furthermore, a sheet of printing paper 13 may be rolled and cut by a cutting mechanism (not shown).

Figure 3A:
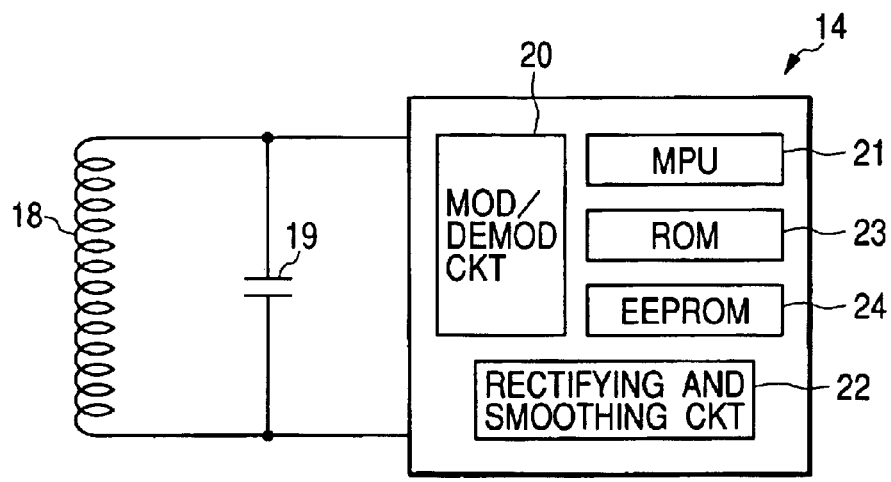
FIG. 3A is a block diagram of the RFID tag shown in FIG. 1.

FIG. 3A is a block diagram of the RFID tag 14. The RFID tag 14 comprises an antenna coil 18 for receiving and transmitting radio wave signals, a resonance capacitor 19, a rectifying and smoothing circuit 22, a microprocessor unit (MPU) 21, a modulation/demodulation circuit 20, and a memory comprising a non-volatile memory, i.e., an EEPROM 24, and a ROM 23.

The antenna coil 18 is connected to the resonance capacitor 19 in parallel to form a resonance circuit for receiving a radio wave power transmission signal to supply the received power signal to the rectifying circuit in the rectifying and smoothing circuit 22. The rectifying circuit rectifies the radio wave power transmission signal and the smoothing circuit smoothes the rectified signals. Thus, the rectifying and smoothing circuit 22 acts as a power supply to provide a dc power supply which is supplied to the circuitry in the RFID tag 14.

The transmitted radio wave power signal carries the modulated data which is subjected to superimposing data on the radio wave power transmission signal. That is, the resonance circuit supplies the received radio wave power transmission signal to the modulation/demodulation circuit 20 also. The modulation/demodulation circuit 20 demodulates the modulated data. The demodulated data is supplied to the microprocessor 21. The microprocessor 21 operates in accordance with programs and data stored in the ROM 23 in the memory circuit and with the received data signal. For example, the microprocessor 21 stores the received data in the radio wave power transmission signal in the EEPROM 24 in the memory circuit and modulates the data from the memory circuit with the modulation circuit in the modulation/demodulation circuital 20 to transmit the data through the antenna coil 18 to a reader-writer communicating with the RFID tag 14.

Figure 3B:
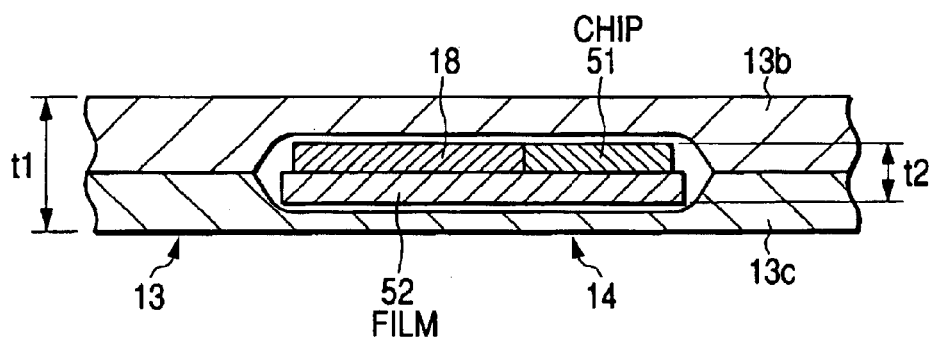
FIG. 3B shows a sectional view of the sheet of the printing paper.

FIG. 3B shows a sectional elevation view of the sheet of the printing paper. The RFID tag 14 is formed as follows:

The antenna coil 18 of the RFID tag 14 is formed by printing a pattern on the film 52 with a flexibility. The modulation/demodulation circuit 20, the MPU 21, the rectifying and smoothing circuit, the ROM 23, and the EEPROM 24 are formed in a chip 51 which is adhered to the film 52. The adhered film 52 is embedded in the sheet of printing paper 13 or sandwiched between sheets 13b and 13c of paper by adhesion. Thus, the entire area of the sheet of printing paper 13 is printable. Here, if it is assumed that the thickness of the sheet of printing paper 13 at places other than the RFID tag 14 is t1, and that the thickness of the RFID tag 14 is t2, the total thickness of the sheets 13b and 13c of printing paper at a place where the RFID tag 14 is embedded or sandwiched is made t1–t2 favorably. This makes the both surfaces of the sheet of the printing paper 13 around the RFID tag 14 flat.

Figure 2:
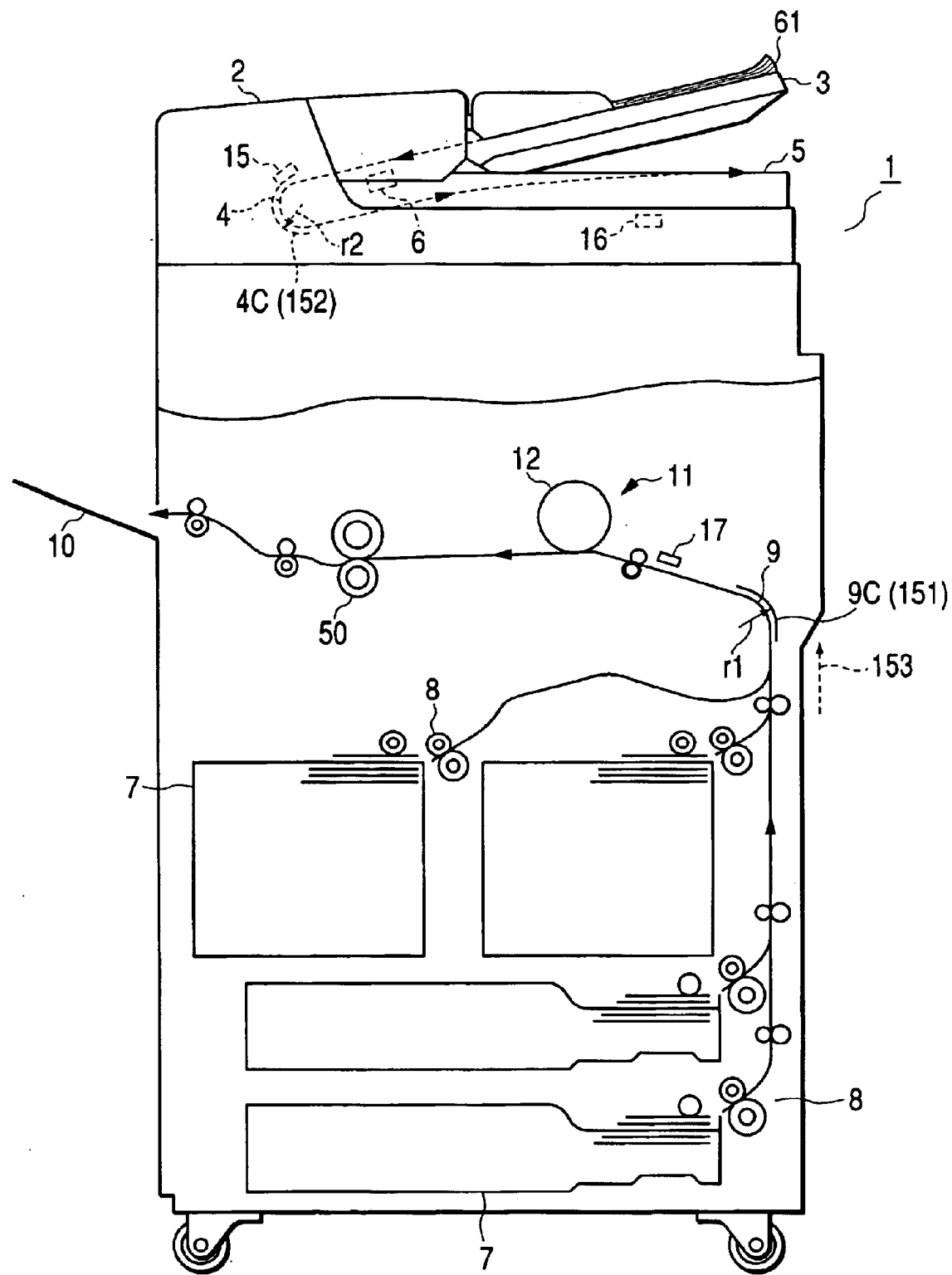
FIG. 2 shows an outline structure of a copy machine with a facsimile function according to this invention.
Figure 5:
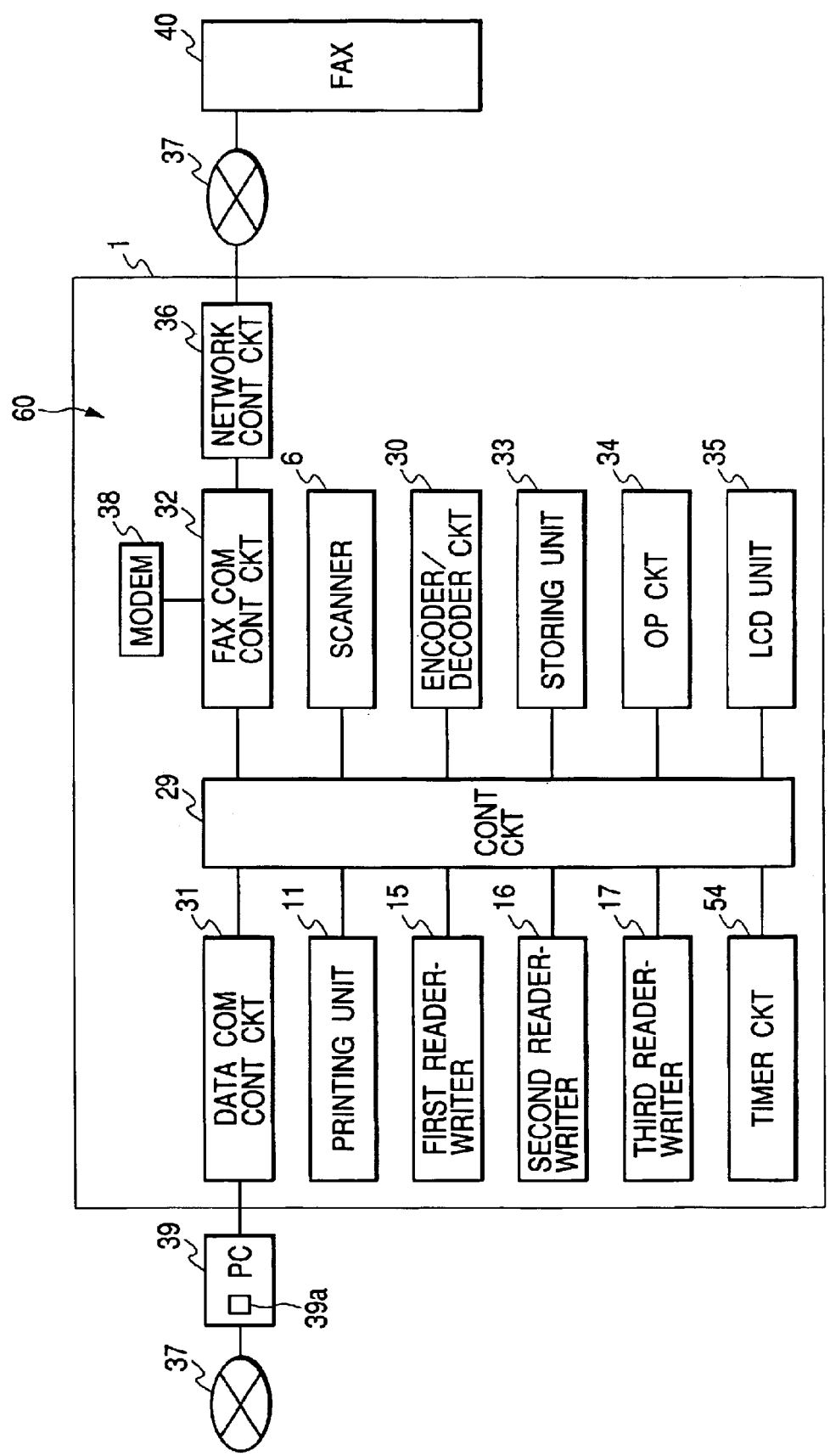
FIG. 5 is a block diagram of the copy machine according to this invention.

FIG. 2 shows an outline structure of a copy machine 1 with a facsimile function. FIG. 5 is a block diagram of the copy machine 1.

In FIG. 2, at the top of the copy machine 1, a platen cover 2 is provided with a hinge mechanism (not shown) to open and close the platen glass (not shown). The platen cover 2 has an automatic document paper feeder (not shown) for automatically feeding the sheet of document paper 61 on the document paper tray 3 to the document paper discharge tray 5 through a document paper feeding path 4. The platen cover 2 includes a scanner 6 comprising a line CCD sensor and a light source (not shown) to optically read an image on the sheet of document paper 61 being fed through the document paper feeding path 4.

Moreover, the copy machine 1 further includes another scanner (not shown) to scan a sheet of document paper 61 on the platen glass in addition to the scanner 6 in the platen cover 2. This scanner optically reads an image on a sheet of document paper 61 which has been placed on the platen glass after the opening of the platen cover 2.

The copy machine 1 includes a plurality of paper trays 7 for containing sheets of printing paper, wherein the paper trays 7 are drawable to put sheets of printing papers therein. Moreover, the copy machine 1 has paper sensors (not shown) to detect the presence sheets of printing paper in respective paper trays 7, respectively. On printing, a sheet of printing paper is automatically fed from the selected paper tray 7 by the automatic paper feeding unit 8 through printing paper feeding paths 9 (represented by solid lines and arrows in the drawing) toward a paper discharge tray 10. At a halfway position on the printing paper feeding path 9, a printing unit 11 is provided. The printing unit adopts a laser electrostatic image transfer method, which is well known. That is, the rotated photosensitive drum 12 is scanned with a laser beam which is turned on and off during scanning to form a latent dot matrix image on the surface of the photosensitive drum 12. Attaching toner to the surface of the photosensitive drum 12 develops the latent image. The developed image is transferred to the printing paper and then, the transferred image is fixed by the heat roller 50.

One of a plurality of paper trays 7 contains the sheets of printing papers 13 with the RFID tags shown in FIG. 1. On the other hand, near the document paper feeding path in the platen cover 2, a first reader-writer 15 is provided to read data (RFID data) in the RFID tag 14 on a sheet of document paper 61 under feeding. Moreover, near the document paper discharge tray 5, a second reader-writer 16 is provided to record the data (RFID data) in the RFID tag. On the other hand, near the printing paper feeding path 9, upstream from the photosensitive drum 12, a third reader-writer 17 is provided to record data (RFID data).

Figure 4:
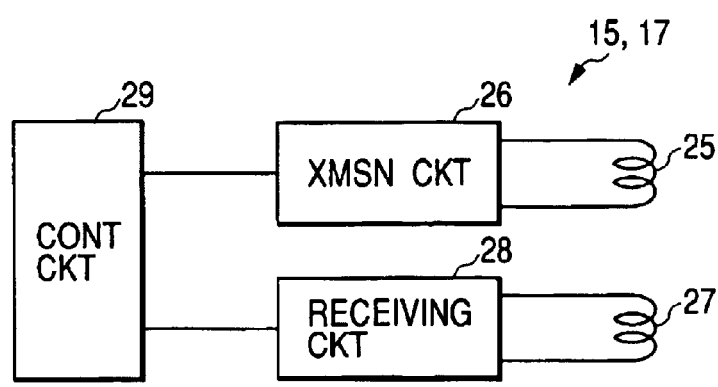
FIG. 4 is a block diagram of the reader-writers shown in FIG. 2.

FIG. 4 is a block diagram of the reader-writers 15 to 17. The reader-writers 15 to 17 transmit the radio wave power signals carrying RFID data to the RFID tag 14 and receive RFID data from the RFID tag 14. Each of the reader-writers 15 to 17 includes a transmission circuit 26 with a transmission antenna 25, and a receiving circuit 28 with a receiving antenna 27. The control circuit 29 communicates with the transmission circuit 26 and with the receiving circuit 28.

On communication with the RFID tag 14, the control circuit 29 transmits the radio wave power signal from the transmission antenna 25 and keeps this transmitting condition. When the control circuit 29 receives RFID data to be transmitted to the RFID tag 14, the control circuit 29 operates the transmission circuit 26 to modulate the radio wave power signal with the data by superimposing the data on the radio wave power signal. The transmission antenna 25 transmits the radio wave power signal which is modulated with the RFID data.

The receiving circuit 28 receives a radio wave signal from the RFID tag 14 through the receiving antenna 27 and demodulates the received signal to obtain the RFID data from the RFID tag 14 to supply the RFID data from the RFID tag 14 to the control circuit 29.

As shown in FIG. 5, the copy machine 1 includes the control circuit 29 and other circuitry connected to the control circuit 29. That is, the first to third reader-writers 15 to 17, the scanner 6, the printing unit 11, an encoder/decoder unit 30, a data communication control circuit 31, a facsimile communication control circuit 32 for facsimile transmission and reception, a storing unit 33, an operation circuit 34, and a liquid crystal display (LCD) unit 35, and a timer circuit 54 are coupled to the control circuit 29.

The control circuit 29 comprises a CPU, a ROM, a RAM, wherein the ROM stores various data and control programs (not shown) such as an algorithm for converting data into a two-dimensional code such as a QR code.

The encoder/decoder 30 encodes the image data read by the scanner 6 into a facsimile signal in accordance with a predetermined encoding method and decodes the received facsimile signal. The data communication control circuit 31 controls communication with an external unit such as a personal computer 39.

The facsimile communication control circuit 32 is coupled to a modem 38 to modulate the transmission signal and demodulate the reception signal and further coupled to a communication network 37 such as PSTN (public switch telephone network) through a network control circuit 36 to communicate with another facsimile 40. The facsimile communication control circuit 32, the modem 38, and the network control circuit 36 form a communication unit 60.

The storing unit 33 stores various data such as video data.

Printing Operation

Figure 6:
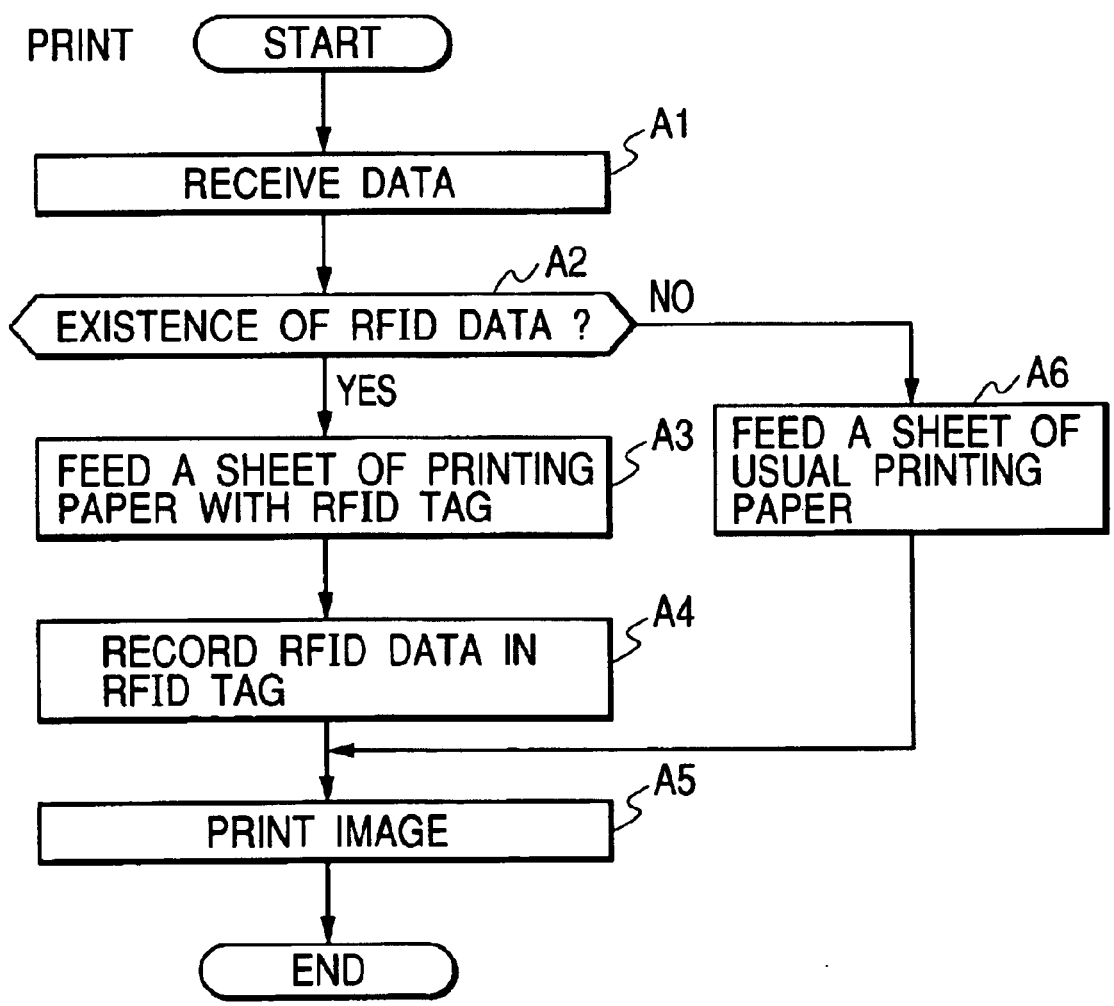
FIG. 6 depicts a flow chart for the printing operation according to this invention.

The copy machine 1 can receive a printing command from the personal computer 39. FIG. 6 depicts a flow chart of the printing operation. When the personal computer 39 transmits the printing command and data to the copy machine 1, the data communication control circuit 31 receives the printing command in step A1. Next, the control circuit 29 judges whether the received data includes RFID data to be written in the RFID tag 14 in step A2. If the received data does not include the RFID data to be written in the RFID tag 14 (NO in step A2), the control circuit 29 controls the automatic paper feeding unit 8 in the printing unit 11 to select one of the paper trays 7 which contains sheets of printing paper without the RFID tags (usual printing papers) and to supply a sheet of printing paper from the selected tray to the printing paper feeding path 9 in step A6. The sheet of printing paper fed from the paper tray 7 is printed by the printing unit 11 to have a printed image including characters or figures or photo images. The printed sheet of printing paper is discharged from the printing paper feeding path 9 to the paper discharge tray 10. Then, the printing process ends.

The received data may include the RFID data to be written in the RFID tag 14. For example, it is favorable that a software is delivered together with its manual. In this case, it is convenient that the software is stored in the RFID tag 14 as digital data and the manual is printed on the sheets of the printing paper 13. For this, the software and the manual are prepared with the personal computer 39. The data of the software is stored in the RFID tag 14, and the characters and graphic data included in the manual are transmitted to the copy machine 1. Here, if it is desired to restrict the persons having the authorization of copying the software or the manual, data specifying the persons who can copy the software or the manual can be stored as permission data, or inhibition data in the RFID tag 14.

When the data including the software and the manual is transmitted from the personal computer 39, the control circuit 29 detects the presence of the RFID data in the transmitted data (YES in step A2). Then, the control circuit 29 selects the paper tray 7 containing sheets of the printing paper 13 having the selected size with the RFID tags 14 and feeds a sheet of the printing paper 13 to the printing paper feeding path 9 from the selected paper tray 7. Next, the control circuit 29 controls the third reader-writer 17 near the printing paper feeding path 9 to store the data of the software transmitted from the personal computer 39 in the RFID tag 14 in step A4. Next, the control circuit 29 controls the printing unit 11 to print an image including characters and figures on the sheet of the printing paper 13 with the RFID tag in step A5. Then, processing ends.

Copying

Figure 7:
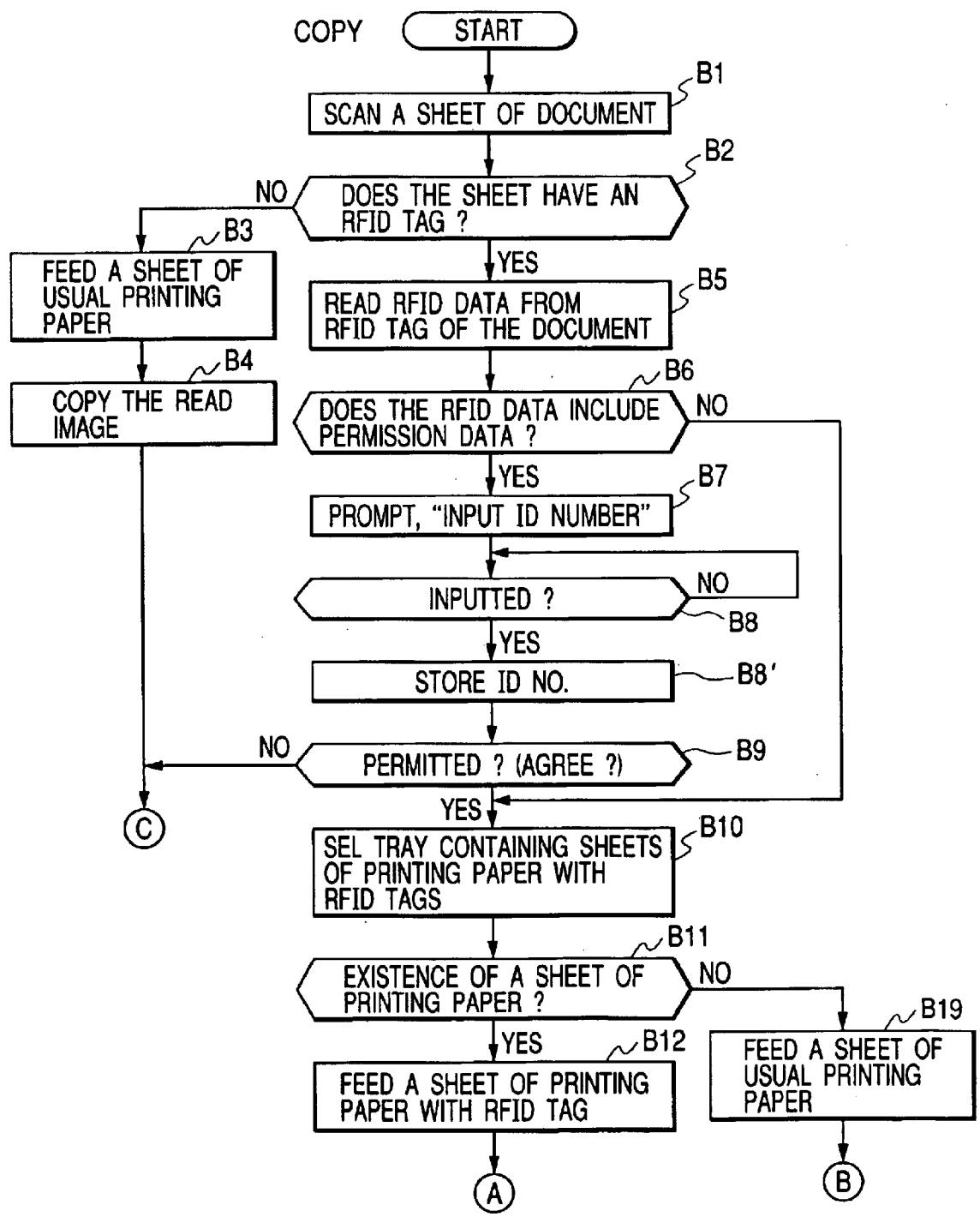
FIGS. 7 and 8 depict a flow chart of a copying operation according to this invention.
Figure 8:
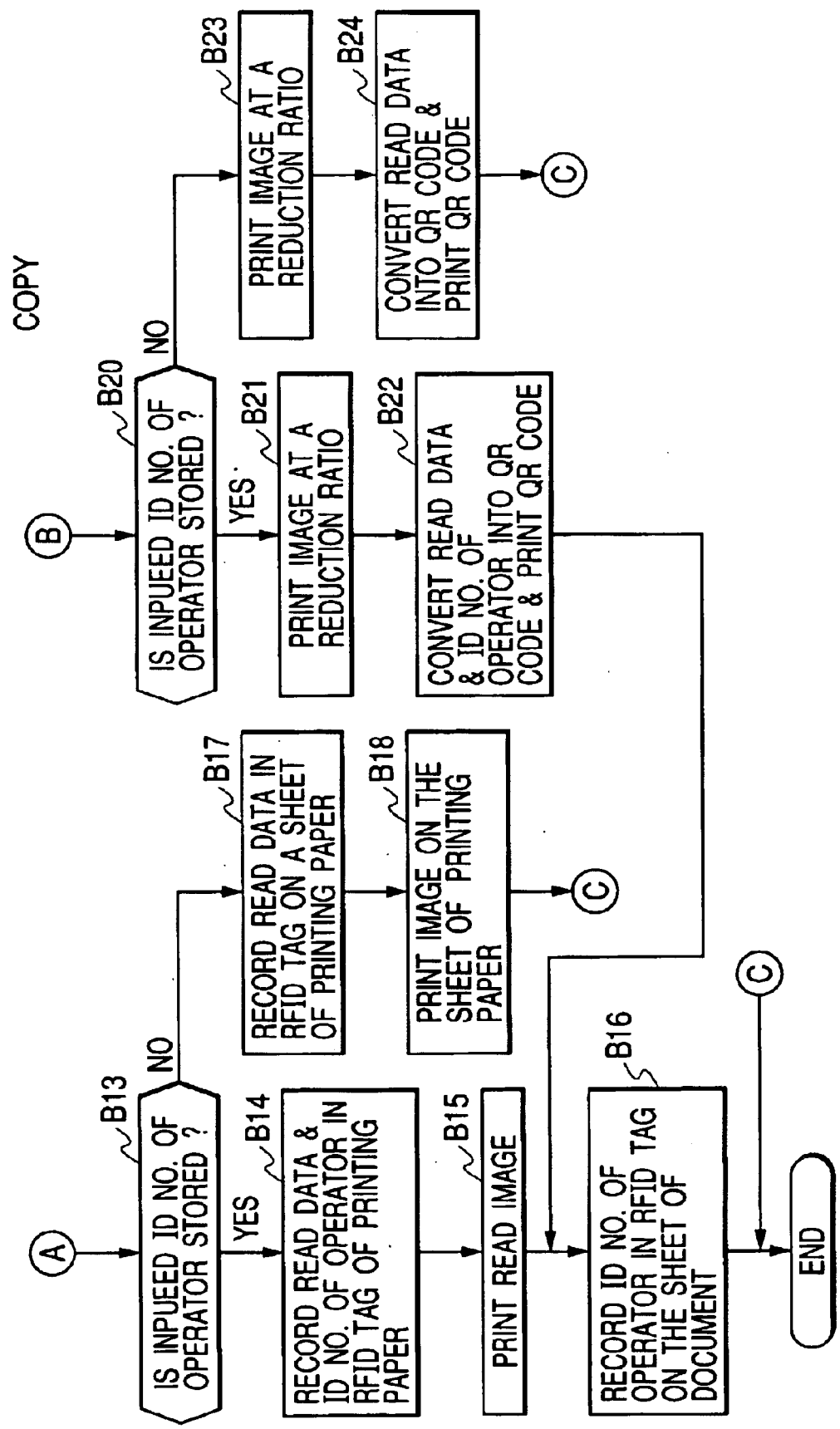

FIGS. 7 and 8 depict a flow chart of a copying operation according to this invention.

On copying, an operator operates the operation circuit 34 to select the copy mode, and then places a sheet of document paper 61 (printing paper) on the document paper tray 3. In this condition, the operator depresses a start key. In response to this, the control circuit 29 executes the routine for copying shown in FIGS. 7 and 8. In FIG. 7, the control circuit 29 feeds a sheet of document paper 61 to the document paper feeding path 4 by operating the automatic document paper feeder (not shown) to read an image including characters or figures on the sheet of document paper 61 with the scanner 6 in step B1. Next, the control circuit 29 judges whether the sheet of document paper 61 has an RFID tag 14. This judgment is made with the first reader-writer 15 arranged near the document paper feeding path 4 as a sensor. More specifically, the control circuit 29 controls the first reader-writer 15 near the document paper feeding path 4 to transmit a multi-read signal from its transmission antenna 25, wherein the multi-read signal is a reading signal directed to not-specified RFID tags.

The RFID tag 14 receiving the multi-read signal transmits a response signal. Thus, if the sheet of document paper 61 set on the document paper tray 3 is derived from the sheet of printing paper 13 with the RFID tag 14 printed as mentioned above, the RFID tag 14 of the sheet of document paper 61 transmits the response signal. If the response signal cannot be received after the transmission of the multi-read signal for a predetermined interval, the control signal 29 judges that the sheet of document paper 61 has no RFID tag (NO in step B2). Then, the control circuit 29 selects the paper tray 7 containing the sheet of usual printing paper and controls the automatic paper feeding unit 8 to feed the sheet of the printing paper without the RFID tag to the printing paper feeding path 9 in step B3. Next, the control circuit 29 prints the image read by the scanner 6 including characters and figures on the sheet of the printing paper.

If the first reader-writer 15 receives the response signal after the transmission of the multi-read signal, the control signal 29 judges that the sheet of document paper 61 has the RFID tag 14 (YES in step B2). Then, the control circuit 29 controls the first reader-writer 15 to read the data in the RFID tag 14 and stores the read data in step B5.

Next, the control circuit 29 judges whether permission data (copy permission data) is included in the data read from the RFID tag 14 in the sheet of document paper 61 in step B6. If the data read from the RFID tag 14 in the sheet of document paper 61 includes no permission data, this indicates that the persons copying this sheet of document paper 61 are not restricted. Thus, the control circuit 29 judges that the answer in step B6 is NO, and processing proceeds to step B10 where the control circuit 29 selects the paper tray 7 containing the sheet of printing paper 13 with RFID tags 14.

If the permission data is included in the data read from the RFID tag in the sheet of document paper 61, the control circuit 29 operates the crystal liquid display 35 to display a prompt, "INPUT ID number", in step B7. In response to the prompt, the operator inputs the operator's ID number with the operation circuit 34 as ID data for copying operation (YES in step B8). Then, the control circuit 29 stores the inputted ID number in step B8' and judges whether the inputted ID number agrees with one of the ID numbers provided to the persons who are permitted to copy the sheet of document paper 61 with the RFID tag 14 in step B9. More specifically, the permission data includes at least an ID number indicative of the authorization of copy operation. The control circuit 29 compares the inputted ID number with the ID number(s) in the permission data. If the ID number disagrees with any ID numbers of copying-permitted persons, the copying operation is interrupted, and processing ends.

If the operator is permitted to copy the sheet of document paper 61 (YES in step B9), the control circuit 29 selects the paper tray 7 containing the printing paper 13 with the RFID tag 14 in step B10.

Next, the control circuit 29 judges whether the selected paper tray 7 contains at least a sheet of the printing paper 13 in accordance with the output of the paper sensor in step B11. If the selected paper tray 7 contains at least a sheet of the printing paper 13 with RFID tag 14 (YES in step B11), the control circuit 29 feeds a sheet of the printing paper 13 with the RFID tag 14 to the printing paper feeding path 9 in step B12.

Next, in step B13, the control circuit 29 judges whether the ID number that of the operator is stored (step B8'). If the ID number is stored (YES in step B13), the control circuit 29 controls the third reader-writer 17 to store the data read from the RFID tag 14 on the sheet of document paper 61 and the stored (inputted) ID number in the RFID tag 14 of the sheet of the printing paper 13 in step B14. Next, the control circuit 29 controls the printing unit 11 to print the image including characters, figures, photo images read from the sheet of document paper 61 with the RFID tag in step B15. In the following step B16, the control circuit 29 stores the ID number of the operator in the RFID tag 14 of the sheet of document paper 61, and processing ends. In this step, time stamp data from the timer circuit 54 may be stored in the RFID tag 14 also.

If no ID number corresponding to the ID number of the operator is stored (NO in step B13), the control circuit 29 controls the third reader-writer 17 to write the data read from the RFID tag 14 of the sheet of document paper 61 in the RFID tag 14 of the sheet of the printing paper 13 in step B17. Next, the control circuit 29 controls the printing unit 11 to print the image including characters, figures, and photo images read from the sheet of document paper 61 with the RFID tag 14 on the sheet of the printing paper 13 with the RFID tag 14 in step B18, and processing ends.

Here, the paper tray 7 containing the sheets of printing paper 13 with the RFID tags 14 may become empty because all sheets have been used. In this case (NO in step B11), the control circuit 29 selects another paper tray 7 containing sheets of the printing paper without the RFID tags 14 and feeds a sheet of the printing paper without the RFID tag 14 to the printing paper feeding path 9 with the automatic paper feeding unit 8 in step B19. Next, the control circuit 29 judges whether the ID number corresponding to that of the operator is stored in step B20. If the ID number corresponding to that of the operator is stored (YES in step B20), the control circuit 29 controls the printing unit 11 to print the image read from the sheet of document paper 61 on the sheet of the printing paper at a reduction ratio in step B21. In step B22, the control circuit 29 converts the data read from the RFID tag 14, the ID number of the operator in the format of the QR code at the space made by the reduction copy. Next, the control circuit 29 stores the ID number of the operator in the RFID tag 14 of the sheet of document paper 61 in the same way as mentioned above in step B16, and processing ends. In this step, time stamp data from the timer circuit 54 may be stored in the RFID tag 14 also.

If the ID number corresponding to that of the operator has not stored (NO in step B20), the control circuit 29 controls the printing unit 11 to copy the image read from the sheet of document paper 61 at the reduction ratio in step B23 and prints the data read from the RFID tag 14 in the format of the QR code at the spare space made by the reduction ratio copy on the printing paper in step B24, and processing ends.

Figure 11:
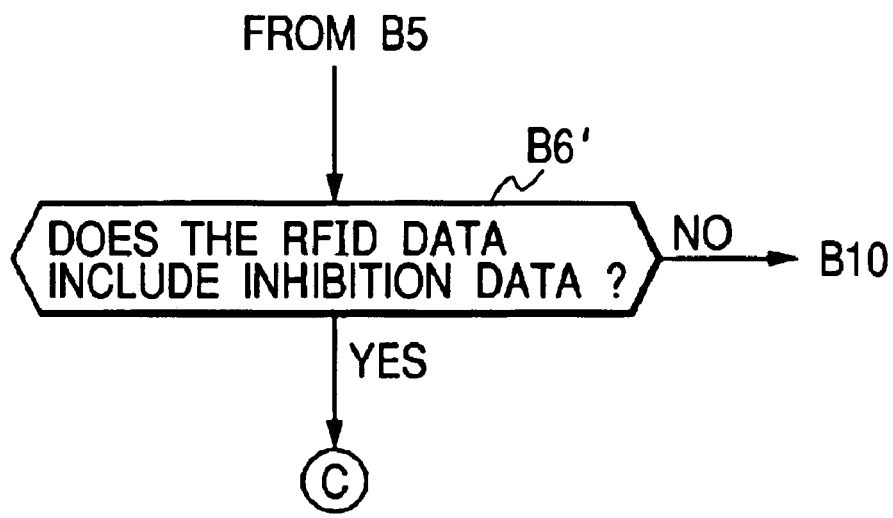
FIG. 11 shows a modified step replacing one of the steps in FIG. 7.

FIG. 11 shows a modified step B6' replacing the step B6 shown in FIG. 7. After step B5, the control circuit 29 judges whether the RFID data read from the RFID tag 14 on the sheet of document paper 61 includes inhibition data. If the data includes the inhibition data, the copy operation is inhibited. Thus, processing proceeds to C in FIG. 8. If the data includes no inhibition data, processing proceeds to step B10.

Facsimile Transmission

Figure 9:
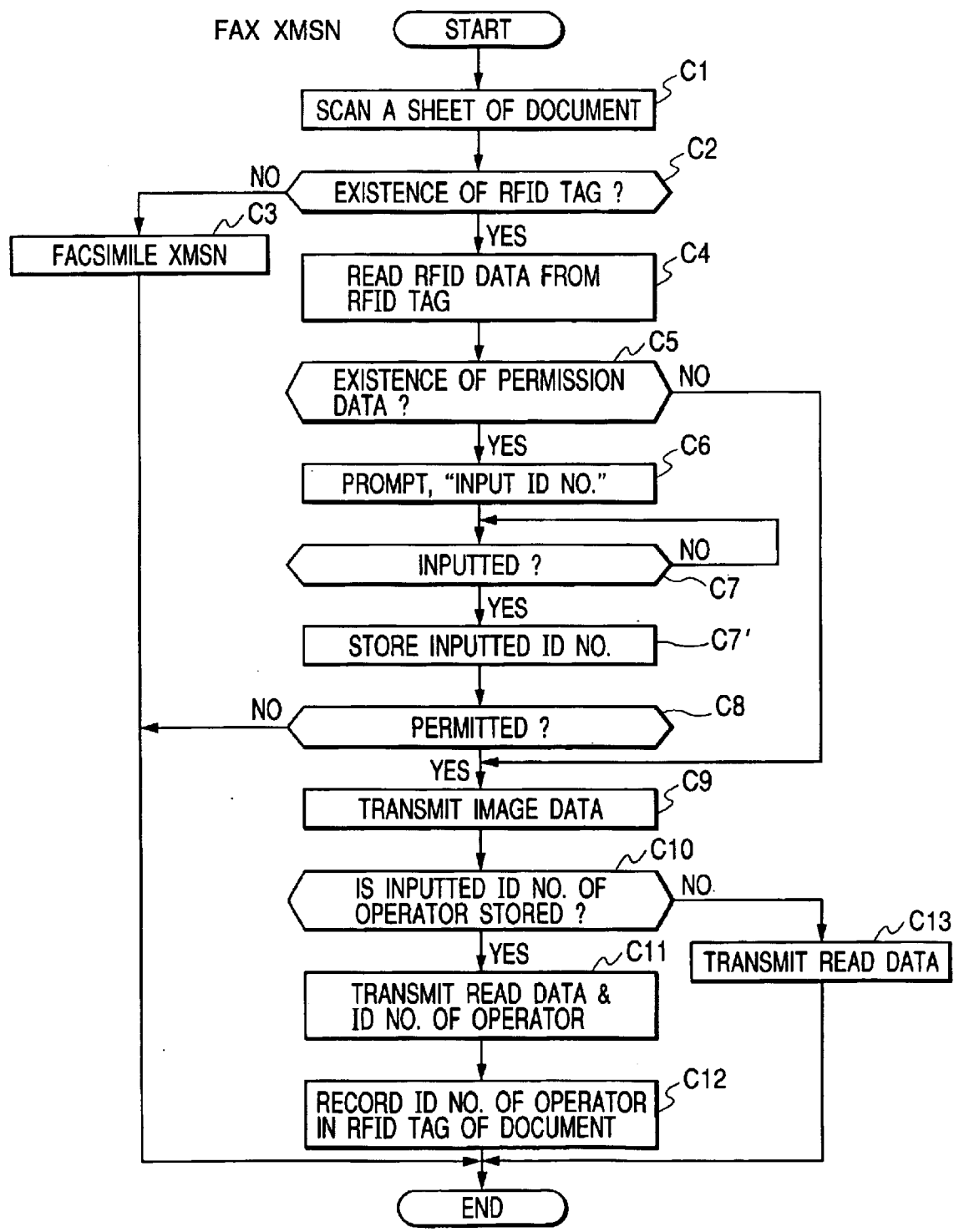
FIG. 9 depicts a flow chart of facsimile transmission according to this invention.

FIG. 9 depicts a flow chart of facsimile transmission according to this invention. On the facsimile transmission, the operator sets the copy machine 1 to a facsimile mode, inputs the telephone number of the facsimile 40 of the third party, places a sheet of document paper 61 on the document paper feeder 3, and then, depresses the start key. In response to this, the control circuit 29 enters the facsimile transmission routine shown in FIG. 9.

The control circuit 29 feeds the sheet of document paper 61 through the document paper feeding path 4 to read the image on the sheet of document paper 61 with the scanner 6 in step C1. Next, the control circuit 29 controls the first reader-writer 15 near the document paper feeding path 4 to transmit the multi-read signal from the transmission antenna 25 and judges whether the sheet of document paper 61 has an RFID tag 14 in step C2. If the sheet of document paper 61 has no RFID tag 14 (NO in step C2), the control circuit 29 converts the image on the sheet of document paper 61 into a facsimile signal and transmits the facsimile signal to the called facsimile 40 in step C3, and processing ends.

If the sheet of document paper 61 (printing paper) has an RFID tag 14 (YES in step C2), the control circuit 29 reads the data from the RFID tag 14 of the sheet of document paper 61 in step C4. Next, the control circuit 29 judges whether the data read from the RFID tag 14 includes permission data (transmission permission data) indicating permission in facsimile transmission to a specified operator in step C5. If the data includes no permission data (NO in step C5), the control circuit 29 immediately transmits the facsimile signal in step C9 because the authorization for transmission is not restricted.

If the data includes the permission data (YES in step C5), the control circuit 29 displays prompt, "INPUT ID NUMBER", in step C6. When the operator inputs the ID number of the operator in response to this prompt (YES in step C7), the control circuit 29 stores the inputted ID number in step C7'. Next, the control circuit 29 judges whether the inputted ID number agrees with one of ID numbers of operators who have authorization for transmission in step C8. If the ID number disagrees with any stored ID numbers from permission data (NO in step C8), the control circuit 29 stops the transmission, and thus processing ends.

If the ID number inputted by the operator is allowed to do facsimile transmission (YES in step C8), the control circuit 29 transmits the facsimile signal including image data indicative of characters and figures on the read sheet of document paper 61 in step C9.

After start of the facsimile transmission, in step C10, the control circuit 29 judges whether the ID number of the operator commanding the facsimile transmission is stored (in step C7'). If no ID number corresponding to the ID number of the operator is stored (NO in step C10), the control circuit 29 transmits the data read from the RFID tag 14 on the sheet of document paper 61 to the network 37 in step C13. If the ID number is stored (YES in step C10), in step C11, the control circuit 29 transmits the data read from the RFID tag of the sheet of document paper 61 and the stored ID number of the operator who has done the facsimile transmission to the network 37. Next, the control circuit 29 controls the second reader-writer 16 to store the ID number of the operator who has done the facsimile transmission in the RFID tag 14 of the sheet of document paper 61 in step C12, and processing ends.

Figure 12:
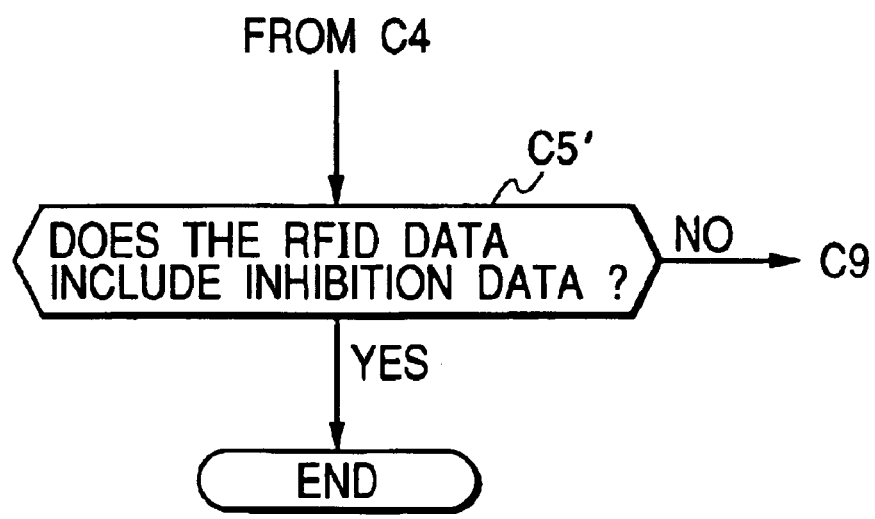
FIG. 12 shows a modified step replacing one of the steps in FIG. 9.

FIG. 12 shows a modified step C5' replacing the step C5 shown in FIG. 9. After step C4, the control circuit 29 judges whether the data read from the RFID tag 14 on the sheet of document paper 61 includes inhibition data. If the data includes the inhibition data, facsimile transmission operation is inhibited. Thus, processing ends. If the data includes no inhibition data, processing proceeds to step C9.

Facsimile Reception

Figure 10:
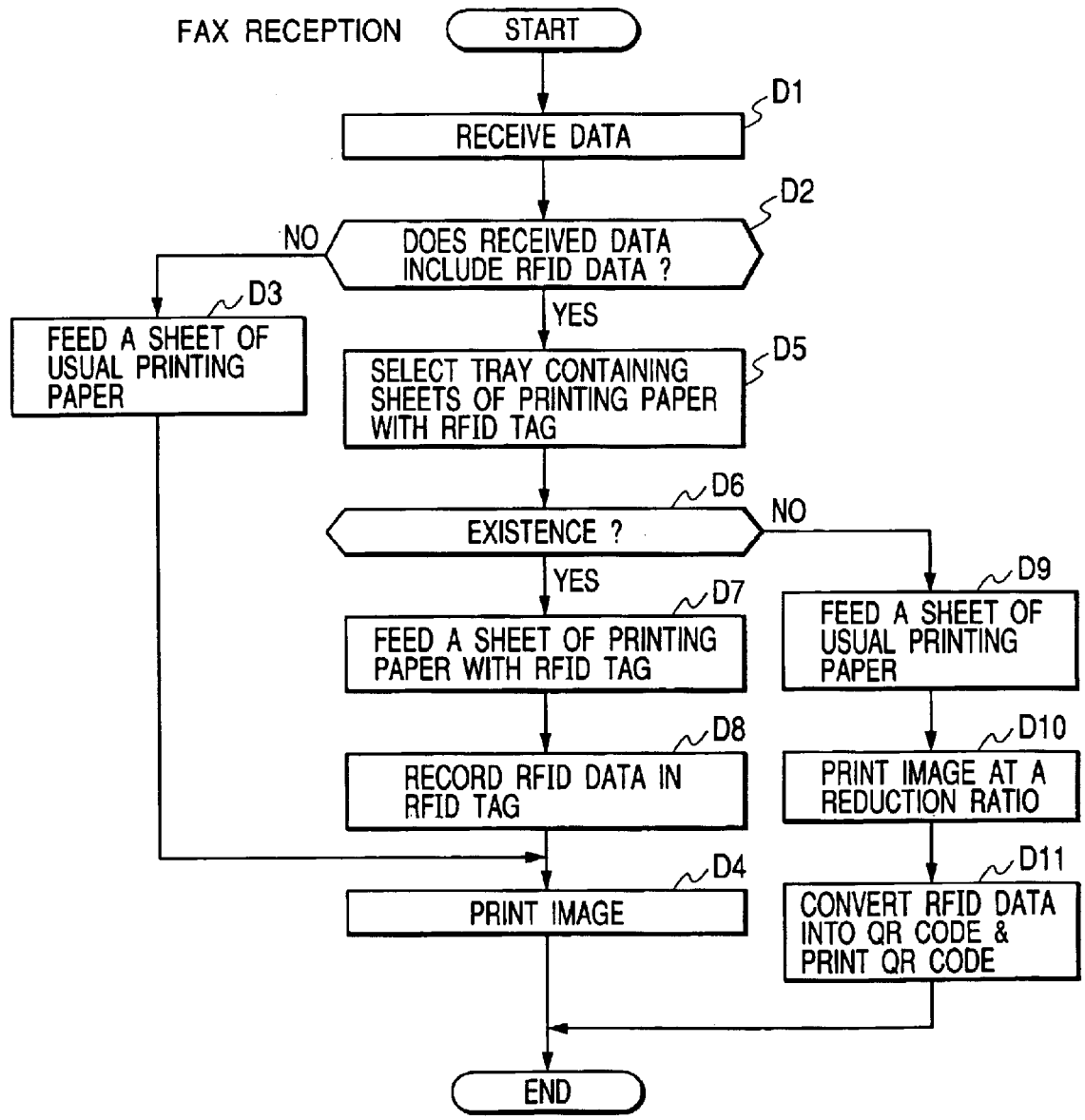
FIG. 10 depicts a flow chart of facsimile reception according to this invention.

FIG. 10 depicts a flow chart of facsimile reception according to this invention. When the network control circuit 36 receives a call signal from the network 37, the control circuit 29 executes the facsimile reception routine shown in FIG. 10. The control circuit 29 receives the facsimile signal to receive data in step D1. Next, the control circuit 29 judges whether the received data includes the RFID data to be written in the RFID tag 14 in step D2. If the received data includes no RFID data (NO in step D2), the control circuit 29 selects the paper tray 7 containing sheets of usual printing paper without the RFID tags 14 in step D3 and feeds a sheet of the usual printing paper to the printing paper feeding path 9. Next, the control circuit 29 controls the printing unit 11 to reproduce the image indicated by the received facsimile signal in step D4, and processing ends.

If the received data includes RFID data to be written in the RFID tag 14 (YES in step D2), the control circuit 29 selects the paper tray 7 containing sheets of printing paper 13 with the RFID tags 14 in step D5. Next, the control circuit 29 judges whether the selected paper tray 7 contains at least a sheet of printing paper 13 with the RFID tag 14 in step D6. If the selected paper tray 7 contains at least a sheet of printing paper 13 with the RFID tag 14 (YES in step D6), the control circuit 29 controls the automatic paper feeding unit 8 to feed a sheet of the printing paper 13 with the RFID tag 14 to the printing paper feeding path 9 in step D7.

Next, the control circuit 29 controls the third reader-writer 17 to write the received RFID data in the RFID tag 14 of the sheet of printing paper 13 with the RFID tag 14 on the printing paper feeding path 9. Moreover, if the received data includes ID number of the operator who has done this facsimile transmission in the RFID tag 14 in this sheet of printing paper 13 in step D8.

Next, the control circuit 29 controls the printing unit 11 to reproduce the image indicated by the received facsimile signal in step D4, and processing ends.

If the selected paper tray 7 contains no sheet of printing paper with the RFID tag (NO in step D6), the control circuit 29 controls the automatic paper feeding unit 8 to feed a sheet of usual printing paper without the RFID tag to the printing paper feeding path 9 in step D9. Next, the control circuit 29 controls the printing unit 11 to reproduce the image indicated by the received facsimile signal at a predetermined reduction ratio in step D10. Next, if the received data includes the RFID data read from the RFID tag 14 on the sheet of document paper 61 or includes the ID number of the operator who has done this facsimile transmission, the control circuit 29 converts the read data and the ID number into a QR code and prints the QR code at the space provided by printing the image at the predetermined reduction ratio in step D11, and processing ends.

According to this embodiment, the RFID tag 14 is provided to the printing paper 13, so that characters, figures, and photo images can be recorded on a sheet of printing paper and as well as the digital data can be recorded in the RFID tag 14 attached to the sheet of printing paper 13. Thus, this structure is favorable for the case where the image data for visualization and the invisible data is dealt with together. For example, this structure is favorable for software attached to its manual.

Moreover, in the cases that the data recorded on a sheet of printing paper 13 with the RFID tag 14 is copied or faxed, the data for permitting the persons to copy the sheet of document paper 61 can be stored in the RFID tag 14 and can be transmitted. Thus, although a person who is inhibited to copy the sheet of document paper 61 or do facsimile transmission tries to copy or fax, this operation is interrupted. Accordingly, if a secret data is recorded in the RFID tag 14, the secret is effectively kept.

Moreover, on copying or facsimile transmission, the ID number of the operator is recorded in the RFID tag 14 on the sheet of document paper 61 or the sheet of printing paper 13. This prevents illegal copying.

Moreover, if no sheet of printing paper with the RFID tag 14 is stored in the paper tray 7, the RFID data to be recorded in the RFID tag 14 is converted into a QR code which is printed on the sheet of the printing paper. This prevents the RFID data from being lost when the sheet of the printing paper 13 with the RFID tag 14 is running out.

Modifications

On copying or facsimile transmission, the operator may be always required to input the ID number of the operator, and the ID number may be recorded in the RFID tag 14 of the sheet of document paper 61. Moreover, the ID number may be recorded only in the RFID tag 14 of the sheet of document paper 61.

The reader-writer for reading data from the RFID tag 14 of the sheet of document paper 61 may commonly used to record the ID number of the operator. In this case, the feeding of the sheet of document paper 61 in the document paper feeding path 4 is temporarily stopped at the place where the RFID tag 14 of the sheet of document paper 61 faces the first reader-writer 15 to read the RFID data. At this position, the ID data of the operator is recorded in the RFID tag 14. Next, the sheet of document paper 61 is supplied to the document paper discharge tray 5.

This invention is applicable to a copy machine without facsimile function or a facsimile without the copy function.

Figure 13:
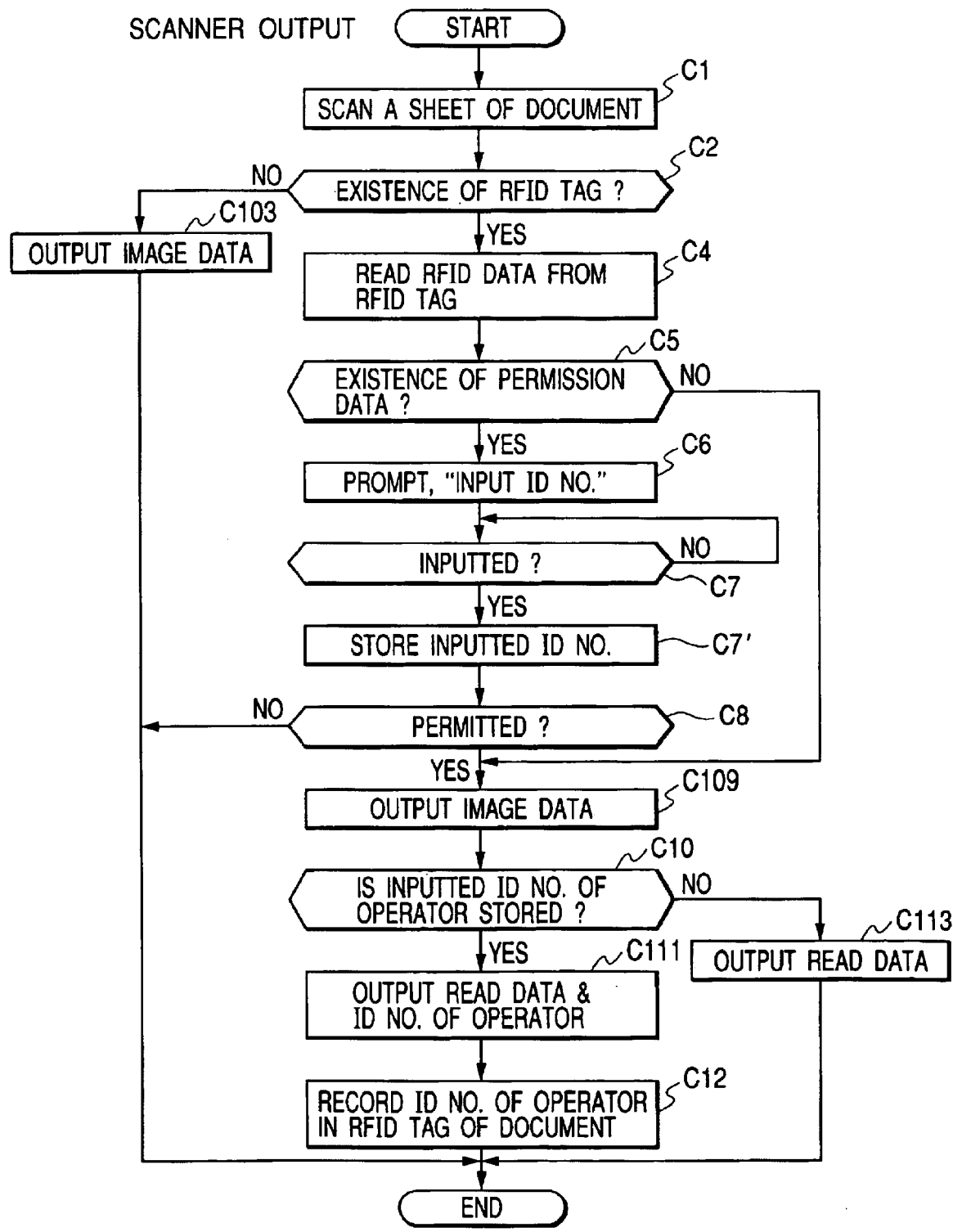
FIG. 13 depicts a flow chart of controlling the scanner of in the copy machine according to a modification of the present invention.

FIG. 13 depicts a flow chart of controlling the scanner 6 of in the copy machine 1. The basic operation is the same as the facsimile transmission operation shown in FIG. 9. More specifically, in steps C103 and C109, the image data is outputted, i.e., supplied to the personal computer 39 instead facsimile transmission. In step C111, the data read from the RFID tag 14 on the sheet of the document paper 61 and the inputted ID number data of the operator is supplied to the personal computer 39. In step C113, the data read from the RFID tag 14 on the sheet of the document paper 61 is outputted, i.e., supplied to the personal computer 39.

Because the copy machine 1 includes the scanner 6, the printing unit 11, and the communication unit 60, the method of controlling scanner 6, the printing unit 11, and the communication unit 60 to execute facsimile transmission through the facsimile signal or another format data and reception operation is disclosed as shown in FIGS. 9 and 10. This operation can be controlled by the personal computer 39 having a communication unit 39a which has the same structure as the communication unit in the copy machine 1 as shown by the flow chart in FIGS. 9 and 10. However, each of units in the copy machine 1 is controlled by the personal computer 39 through the data communication circuit 31. The RFID data from the sheet of document paper 61 is supplied to the personal computer 39. The RFID data to the sheet of printing paper 13 is supplied from the personal computer 39.

This invention is applicable to a facsimile having a copy function. The facsimile effects a copying function to operate the scanner 6 and the printing unit 11 to copy the image on the sheet of printing paper 13. In addition, the inputted identification data is recorded in the RFID tag of the sheet of printing paper in the copying mode, and the RFID data from the sheet of document paper 61 is recorded in the RFID tag of the sheet of the printing paper.

The sheet of printing paper 13 has a flexibility such that the sheet of printing paper 13 can be carried through the paper feeding path 4 and the printing paper feeding path 9 with temporary curl at a corner guides 4c (9c) with contact or on rollers in the paper traveling direction 153 along a line of curvature 151 (152) with radius of curvature r1 (r2) less than 10 cm, 5 cm, or 2 cm with a turning angle of more than 45° (the corner guides 4c has a turning angle of about 180°). The flexibility of the sheet of printing paper 13 is higher than that of a plastic card such as a prepaid card, and the rigidity is lower than that of the plastic card. The sheet of printing paper 13 is generally made from vegetable fibers. However, a synthetic paper may be used.

The sheet of printing paper 13 has no obstacle image on it one or both surfaces. In other words, the sheet of printing paper 13 may have rule lines or a logotype at edge thereof, but the surfaces has no meaningful image to print usual characters (text) or images thereon. However, the sheet of printing paper may have a predetermined formal image having blanks to be filled with characters.

The surface of the sheet of printing paper 13 has a predetermined printable characteristics, such that, a suitable roughness, a lipophilic property which is higher than that of a plastic card, and a hydrophilic property which is higher than that of a plastic card. The sheet of printing paper 13 may be printed as a bill.

What is claimed is:

1. A copying machine comprising:
   image reading means for reading an image on a sheet of document paper selectively including a first RFID tag for receiving, storing, and transmitting first data;
   printing means for printing said image on a sheet of printing paper which includes a second RFID tag for receiving, storing, and transmitting second data;
   data reading means for reading said first data from said first RFID tag;
   data recording means for recording said first data from said data reading means as said second data in said second RFID tag;
   inputting means for inputting identification data of an operator operating said copy machine;
   permission data reading means for operating said data reading means to read permission data including identification data in said first data from said first RFID tag;
   comparing means for comparing said identification data from said data reading means with said identification data from said inputting means; and
   control means for permitting said printing means to copy said image on a sheet of said printing paper when said identification data from said data reading means agrees with said identification data from said inputting means when said permission data reading means can read said permission data.

2. The copy machine as claimed in claim 1, further comprising:
   detecting means for detecting whether said sheet of document paper includes said first RFID tag; and
   paper feeding means having a first paper tray for containing at least a sheet of first printing paper with said first RFID tag and a second paper tray for containing at least a sheet of second printing paper without said first RFID tag, wherein said paper feeding means feeds a sheet of said first printing paper with said first RFID tag from said first paper tray to print said first image from said image reading means with said printing means on a sheet of said first printing paper and to record said first RFID data in said first RFID tag of said sheet of said first printing paper when said detection means detects that said sheet of document paper has said first RFID tag.

3. The copying machine as claimed in claim 2, further comprising:
   identification data recording means for recording said identification data from said inputting means as said first data in said first RFID tag when said detection means detects that said sheet of document paper includes said first RFID tag.

4. The copying machine as claimed in claim 1, further comprising:
   identification data recording means for recording said identification data from said inputting means as said first data in said first RFID tag.

5. The copying machine as claimed in claim 1, further comprising:
   identification data recording means for operating said data recording means to record said identification data from said inputting means as said second data in said second RFID tag.

6. The copying machine as claimed in claim 1, further comprising:
   inhibition data reading means for operating said data reading means to read inhibition data in said first data from said first RFID tag; and
   inhibiting means for inhibiting said printing means from copying said image on said printing paper when said inhibition data can be read from said first RFID tag.

7. The copying machine as claimed in claim 1, wherein said control means operates said inputting and comparing means when said permission data reading means can read said permission data.

8. A copying machine comprising:
   image reading means for reading an image on a sheet of document paper selectively including a first RFID tag for receiving, storing, and transmitting first data;
   printing means for printing said image on a sheet of printing paper which includes a second RFID tag for receiving, storing, and transmitting second data;
   data reading means for reading said first data from said first RFID tag;
   data recording means for recording said first data from said data reading means as said second data in said second RFID tag;
   identification data reading means for operating said data reading means to read identification data in said first RFID tag;
   inputting means for inputting identification data of an operator operating said copy machine;
   comparing means for comparing said identification data from identification data reading means with identification data from said inputting means; and
   control means for permitting said printing means to copy said image on said printing paper when said identification data from identification data reading means agrees with said identification data from said inputting means.

9. A facsimile comprising:
   image reading means for reading an image on a sheet of document paper selectively including a first RFID tag to generate first image data, said first RFID tag receiving, transmitting, and storing first RFID data;
   transmitting means for transmitting first RFID data including said first image data;

RFID data reading means for reading said first RFID data from said first RFID tag, said transmitting means transmitting said first RFID data together with said first image data;

receiving means for receiving second data including second image data and second RFID data;

printing means for printing said second image on a sheet of printing paper with a second RFID tag, said second RFID tag receiving, transmitting, and storing second RFID data;

RFID data recording means for recording said second RFID data in said second RFID tag of said sheet of printing paper;

identification data reading means for operating said RFID data reading means to read identification data in said first RFID tag;

inputting means for inputting identification data of an operator operating said facsimile;

comparing means for comparing said identification data from identification data reading means with identification data from said inputting means; and control means for permitting said transmitting means to transmit said first image data when said identification data from identification data reading means agrees with said identification data from said inputting means.

10. The facsimile as claimed in claim 9, further comprising:

detecting means for detecting whether said sheet of document paper includes said first RFID tag, wherein said transmitting means further transmits said first RFID data when said detecting means detects that said sheet of document paper includes said first RFID tag.

11. The facsimile as claimed in claim 9, further comprising:

detecting means for detecting whether said received data includes said second RFID data; and paper feeding means having first paper tray for containing at least a sheet of first printing paper with said second RFID tag and second paper tray for containing at least a sheet of second printing paper without said second RFID tag, wherein said paper feeding means feeds said sheet of first printing paper with said first RFID tag from said first paper tray to print said second image with said printing means on said sheet of first printing paper and record said second RFID data in said second RFID tag of said sheet of said second printing paper when said detection means detects that said received data includes said second RFID data.

12. The facsimile as claimed in claim 9, further comprising:

identification data recording means for recording said identification data from said inputting means as said first RFID data in said first RFID tag.

13. The facsimile as claimed in claim 12, further comprising copying means for effecting a copying function to operate said image reading means and said printing means to copy said image as said second image data on said printing paper, wherein said identification data recording means operates said RFID data recording means to record said identification data from said inputting means as said second RFID data when said copying means effects said copying function.

14. The facsimile as claimed in claim 9, further comprising:

identification data transmission means for operating said transmitting means to transmit said identification data from said inputting means as said first image data.

15. The facsimile as claimed in claim 9, further comprising:

inhibition data reading means for operating said data reading means to read inhibition data in said first RFID data from said first RFID tag; and inhibiting means for inhibiting said transmitting means to transmit said first RFID data when said inhibition data can be read from said first RFID tag.

16. A facsimile comprising:

image reading means for reading an image on a sheet of document paper selectively including a first RFID tag to generate first image data, said first RFID tag receiving, transmitting, and storing first RFID data;

transmitting means for transmitting first data including said first image data;

RFID data reading means for reading said first RFID data from said first RFID tag, said transmitting means transmitting said first RFID data together with said first data;

receiving means for receiving second data including second image data and second RFID data;

printing means for printing said second image data on a sheet of printing paper with a second RFID tag, said second RFID tag receiving, transmitting, and storing second RFID data;

RFID data recording means for recording said second RFID data in second RFID tag of said sheet of printing paper;

inputting means for inputting identification data of an operator operating said facsimile;

identification data recording means for recording said identification data from said inputting means as said first data in said first RFID tag;

permission data reading means for operating said RFID data reading means to read permission data including identification data in said first data from said first RFID tag;

comparing means for comparing said identification data from identification data reading means with said identification data from said inputting means; and control means for permitting said transmitting means to transmit said first data when said identification data from identification data reading means agrees with said identification data from said inputting means when said permission data reading means can read said permission data.

17. A copying machine comprising:

image reading means for reading an image on a sheet of document paper selectively including a first RFID tag for receiving, storing, and transmitting first data;

paper feeding means having a first paper tray for containing at least a sheet of first printing paper with said first RFID tag and second paper tray for containing at least a sheet of second printing paper without said first RFID tag;

printing means for printing said image on a sheet of printing paper from said paper feeding means;

data reading means for reading said first data from said first RFID tag;

data recording means for recording said first data from said data reading means as second data in a second RFID tag;

detecting means for detecting whether said sheet of document paper includes said first RFID tag, wherein said paper feeding means feeds a sheet of said first printing paper with said first RFID tag from said first paper tray to print said image from said image reading means with said printing means on a sheet of first printing paper and to record said first RFID data in said first RFID tag of said sheet of said first printing paper when said detection means detects that said sheet of document paper has said first RFID tag and feeds a sheet of said second printing paper without said first RFID tag from said second paper tray to print said image from said image reading means with said printing means on a sheet of second printing paper when said detection means does not detect that said sheet of document paper has said first RFID tag.

18. The copying machine as claimed in claim 17, further comprising:

inputting means for inputting identification data of an operator operating said copy machine; and identification data recording means for operating said data recording means to record said identification data from said inputting means as said first data in said first RFID tag when said detection means detects that said sheet of document paper includes said first RFID tag.

19. A facsimile comprising:

image reading means for reading an image on a sheet of document paper including a first RFID tag to generate first image data, said first RFID tag receiving, transmitting, and storing first RFID data;

transmitting means for transmitting first data including said first image data;

RFID data reading means for reading said first RFID data from said first RFID tag, said transmitting means transmitting said first RFID data together with said first data;

receiving means for receiving second data including second image data and second RFID data;

paper feeding means having a first paper tray for containing at least a sheet of first printing paper with said first RFID tag and second paper tray for containing at least a sheet of second printing paper without said first RFID tag;

printing means for printing said image on a sheet of printing paper from said paper feeding means;

RFID data recording means for recording said second RFID data in a second RFID tag of said sheet of first printing paper when said receiving means receives said second RFID data, wherein said paper feeding means feeds said sheet of first printing paper with said second RFID tag from said first paper tray to print said image from said image reading means with said printing means on a sheet of first printing paper and to record said second RFID data in said second RFID tag of said sheet of first printing paper when said receiving means receives said second RFID data and feeds a sheet of said second printing paper without said second RFID tag from said second paper tray to print said image from said image reading means with said printing means on a sheet of second printing paper when said receiving means does not receive said second RFID data.

20. A facsimile comprising:

image reading means for reading an image on a sheet of document paper including a first RFID tag to generate first image data, said first RFID tag receiving, transmitting, and storing first RFID data;

transmitting means for transmitting first data including said first image data;

RFID data reading means for reading said first RFID data selectively including inhibition data from said first RFID tag, said transmitting means transmitting said first RFID data together with said first data;

receiving means for receiving second data including second image data and second RFID data;

printing means for printing said image on a sheet of printing paper with a second RFID tag, said second RFID tag receiving, transmitting, and storing second RFID data;

RFID data recording means for recording said second RFID data in said second RFID tag of said sheet of printing paper;

inhibition data reading means for operating said data reading means to read said inhibition data in said first RFID data from said first RFID tag; and inhibiting means for inhibiting said transmitting means to transmit said first RFID data when said inhibition data can be read from said first RFID tag.

* * * * *

UNITED STATES PATENT AND TRADEMARK OFFICE
CERTIFICATE OF CORRECTION

PATENT NO. : 6,827,279 B2  
APPLICATION NO. : 10/126627  
DATED : December 7, 2004  
INVENTOR(S) : Teraura Page 1 of 1

It is certified that error appears in the above-identified patent and that said Letters Patent is hereby corrected as shown below:

Title page, item [73] Assignee should read --

Denso Corporation, Kariya (JP)

Signed and Sealed this

Twenty-ninth Day of August, 2006

JON W. DUDAS  
*Director of the United States Patent and Trademark Office*